US010013896B2

(12) United States Patent
Feins et al.

(10) Patent No.: US 10,013,896 B2
(45) Date of Patent: Jul. 3, 2018

(54) MODULAR STAGED REALITY SIMULATOR

(71) Applicant: The University of North Carolina at Chapel Hill, Chapel Hill, NC (US)

(72) Inventors: Richard H. Feins, Chapel Hill, NC (US); W. Andrew Grubbs, Chapel Hill, NC (US); Alexander McLain Grubbs, Chapel Hill, NC (US); Matthew M. Dedmon, Cambridge, MA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 0 days.

(21) Appl. No.: 15/644,299

(22) Filed: Jul. 7, 2017

(65) Prior Publication Data
US 2017/0309204 A1    Oct. 26, 2017

Related U.S. Application Data

(63) Continuation of application No. 15/148,317, filed on May 6, 2016, now Pat. No. 9,711,067, which is a continuation of application No. 13/882,421, filed as application No. PCT/US2011/058279 on Oct. 28, 2011, now Pat. No. 9,342,997.

(60) Provisional application No. 61/408,413, filed on Oct. 29, 2010.

(51) Int. Cl.
G09B 23/28    (2006.01)
G09B 23/30    (2006.01)
G09B 19/00    (2006.01)

(52) U.S. Cl.
CPC ........... *G09B 23/306* (2013.01); *G09B 19/00* (2013.01); *G09B 23/30* (2013.01); *G09B 23/303* (2013.01)

(58) Field of Classification Search
USPC .................................................. 434/262, 268
See application file for complete search history.

(56) References Cited

U.S. PATENT DOCUMENTS

| 4,266,669 A | 5/1981 | Watson |
| D293,820 S | 1/1988 | Guth et al. |
| 4,847,932 A | 7/1989 | Baribault, Jr. |

(Continued)

FOREIGN PATENT DOCUMENTS

| BE | 1020674 A3 | 3/2014 |
| EP | 2070487 A2 | 6/2009 |

(Continued)

OTHER PUBLICATIONS

Feins, Expert commentary: Cardiothoracic surgical simulation, The Journal of Thoracic and Cardiovascular Surgery, 2008,135(3), 485-485.

(Continued)

*Primary Examiner* — Kesha Frisby
(74) *Attorney, Agent, or Firm* — Olive Law Group, PLLC; Nathan P. Letts

(57) ABSTRACT

This invention is directed to a modular staged simulator and a process of simulating medical trauma and maladies for the purpose of training or certifying individuals including medical professionals. More specifically, this disclosure relates to ex vivo training exercises as opposed to traditional forms of training using intact cadavers, in vivo surgery on animal subjects; and supervised apprenticeship performing surgery on human subjects with trauma or maladies under the watch of a skilled medical practitioner.

20 Claims, 4 Drawing Sheets

(56) References Cited

U.S. PATENT DOCUMENTS

| | | |
|---|---|---|
| 5,217,003 A | 6/1993 | Wilk |
| 5,358,408 A | 10/1994 | Medina |
| 5,425,644 A | 6/1995 | Szinicz |
| 5,609,560 A | 3/1997 | Ichikawa et al. |
| 5,792,135 A | 8/1998 | Madhani et al. |
| 5,817,084 A | 10/1998 | Jensen |
| 5,873,732 A | 2/1999 | Hasson |
| 5,947,743 A | 9/1999 | Hasson |
| 5,951,301 A | 9/1999 | Younker |
| 6,331,181 B1 | 12/2001 | Tierney et al. |
| 6,336,812 B1 | 1/2002 | Cooper |
| 6,441,577 B2 | 8/2002 | Blumenkranz et al. |
| 6,491,701 B2 | 12/2002 | Tierney et al. |
| D471,641 S | 3/2003 | McMichael et al. |
| 6,659,939 B2 | 12/2003 | Moll et al. |
| 6,780,016 B1 | 8/2004 | Toly |
| 6,790,043 B2 | 9/2004 | Aboud |
| 6,817,974 B2 | 11/2004 | Cooper et al. |
| D565,743 S | 4/2008 | Phillips et al. |
| 7,413,565 B2 | 8/2008 | Wang et al. |
| D608,456 S | 1/2010 | Sandel |
| D618,821 S | 6/2010 | Larsen |
| 7,798,815 B2 | 9/2010 | Ramphal |
| D638,137 S | 5/2011 | Gross et al. |
| 7,963,913 B2 | 6/2011 | Devengenzo et al. |
| D650,912 S | 12/2011 | Tomes et al. |
| D676,573 S | 2/2013 | Austria |
| 8,600,551 B2 | 12/2013 | Itkowitz et al. |
| 8,656,929 B2 | 2/2014 | Miller et al. |
| D704,856 S | 5/2014 | Tomes et al. |
| 9,259,289 B2 | 2/2016 | Zhao et al. |
| 9,271,798 B2 | 3/2016 | Kumar et al. |
| 9,342,997 B2 | 5/2016 | Feins et al. |
| 9,711,067 B2 | 7/2017 | Feins et al. |
| 2004/0033477 A1 | 2/2004 | Ramphal et al. |
| 2006/0087746 A1 | 4/2006 | Lipow |
| 2006/0148062 A1 | 7/2006 | Hassanein et al. |
| 2006/0178559 A1 | 8/2006 | Kumar et al. |
| 2006/0258938 A1 | 11/2006 | Hoffman et al. |
| 2007/0156017 A1 | 7/2007 | Lamprecht et al. |
| 2009/0088634 A1 | 4/2009 | Zhao et al. |
| 2010/0169815 A1 | 7/2010 | Zhao et al. |
| 2010/0274087 A1 | 10/2010 | Diolaiti et al. |
| 2012/0290134 A1 | 11/2012 | Zhao et al. |
| 2013/0038707 A1 | 2/2013 | Cunningham et al. |
| 2013/0107207 A1 | 5/2013 | Zhao et al. |
| 2013/0226343 A1 | 8/2013 | Baiden |
| 2013/0330700 A1 | 12/2013 | Feins et al. |
| 2014/0135648 A1 | 5/2014 | Holoien et al. |
| 2014/0186809 A1 | 7/2014 | Hendrickson et al. |
| 2014/0236175 A1 | 8/2014 | Cooper et al. |
| 2014/0282196 A1 | 9/2014 | Zhao et al. |
| 2014/0329217 A1 | 11/2014 | Barsness et al. |
| 2015/0024362 A1 | 1/2015 | Feins et al. |
| 2015/0257958 A1 | 9/2015 | Allen et al. |

FOREIGN PATENT DOCUMENTS

| | | |
|---|---|---|
| ES | 2144375 A1 | 6/2000 |
| WO | 0180203 A1 | 10/2001 |
| WO | 2012058527 A2 | 5/2012 |
| WO | 2012058533 A2 | 5/2012 |
| WO | 2012060901 A1 | 5/2012 |
| WO | 2015095715 A1 | 6/2015 |

OTHER PUBLICATIONS

Hicks et al., Cardiopulmonary bypass simulation at the Boot Camp, The Journal of Thoracic and Cardiovascular Surgery, 2011, 141(1), 284-292.
Ramphal et al., A high fidelity tissue-based cardiac surgical simulator, 2005, European Journal of Cardio-thoracic Surgery, 27 (2005) 910-916.
Tesche et al., Simulation Experience Enhances Medical Students' Interest in Cardiothoracic Surgery, 2010, Ann Thorac Surg, 90:1967-74.
PCT International Searching Authority, Int'l Search Report, May 15, 2012, regarding PCT/US2011/058279.
www.laerdal.com webpage, retrieved Oct. 18, 2010, Laerdal homepage with SimNewB description, 1 page.
http://www.med.unc.edu/~dedmon/Site/Photos.html, retrieved Oct. 14, 2011, Development of a Pulmonary Surgical Simulator photos, 3 pages.
La Torre el al.;"Resident training in laparoscopic colorectal surgery: role of porcine model" World J. Surg. Sep. 2012; 36(9); pp. 2015-2020. Abstract only.
http://www.meti.com/products_ps_hps.htm, retrieved Oct. 18, 2010, METI HPS—Human Patient Simulator webpage, 1 page.
http://research.unc.edu/otd/, retrieved Jun. 3, 2009, Pulmonary Surgical Simulator, Carolina Blue Opportunity webpage, 2 pages.
Turner, A. Simon; "Experiences with sheep as an animal model for shoulder surgery: Strength and shortcomings"; ~007 Journal of Shoulder and Elbow Surgery Board of Trustees; pp. 158S-163S.
U.S. Appl. No. 61/554,741, filed Nov. 2, 2011.
U.S. Appl. No. 15/138,403, filed Apr. 26, 2016.
U.S. Appl. No. 15/138,427, filed Apr. 26, 2016.
U.S. Appl. 15/138,445.
International Search Report and Written Opinion dated Aug. 8, 2016 from related International Application No. PCT/US2016/029456.
International Search Report and Written Opinion dated Aug. 2, 2016 from related International Application No. PCT/US2016/029463.
International Search Report and Written Opinion dated Jul. 20, 2016 from related International Application No. PCT/US2016/029470.
Final Office action dated Oct. 6, 2016 from related U.S. Appl. No. 14/340,265.
Written Opinion dated Aug. 9, 2017 from related International Application No. PCT/US2016/051887.
Canadian Search Report issued in counterpart Canadian Application No. 2,816,089 dated Nov. 1, 2017 (four (4) pages).
International Search Report and Written Opinion issued in counterpart PCT Application No. PCT/US2017/026097 dated Jun. 14, 2017 (twelve (12) pages).
Canadian Examination Report issued in counterpart Canadian Application No. 2,857,862 dated Apr. 27, 2018 (six (6) pages).

MODULAR STAGED REALITY SIMULATOR

RELATED APPLICATION

This application is a continuation application of U.S. patent application Ser. No. 15/148,317, filed May 6, 2016, which is a continuation of U.S. patent application Ser. No. 13/882,421, filed Aug. 26, 2013 which is a is a § 371 U.S. National Stage of International Application PCT/US2011/058279, filed Oct. 28, 2011 which claims the benefit of U.S. Provisional Patent Application No. 61/408,413, filed Oct. 29, 2010 entitled "Modular Staged Reality Simulator" naming Richard H. Feins et al. as inventors. The entire contents of which are hereby incorporated by reference including all text, tables, and drawings.

FIELD OF THE INVENTION

This disclosure relates generally to the process of simulating medical trauma and maladies for the purpose of training or certifying medical professionals. More specifically, this disclosure relates to ex vivo training exercises as opposed to traditional forms of training using intact cadavers, in vivo surgery on animal subjects; and supervised apprenticeship performing surgery on human subjects with trauma or maladies under the watch of a skilled medical practitioner.

BACKGROUND

Context.

Historically, surgical training involved an apprenticeship model provided almost exclusively in a hospital setting. Residents performed surgery under the supervision of more experienced surgeons. The type of situations presented to the surgeon trainee was largely driven by chance as the nature and timing of situations needing surgery found in patients was not under anyone's control. This model of using a stream of situations as presented by clinical service of human patients does not provide a model for repetition until mastery. As the number of hours that residents are available for surgery has decreased, the range of surgical events presented to surgical residents has decreased. The failure rate for surgery board certification exams is now in the range of 26 percent. For specialized board certification such as thoracic surgery, the rate has been as high as 33 percent.

Virtual reality training based on the field sometimes called serious gaming or alternative learning techniques has value for teaching medical providers interviewing or diagnostic skills. Virtual reality training may be of use for demonstrating the ability to prioritize in triage and for showing knowledge of the sequence of steps but does not allow practice of the specific tactile skills used in surgical processes.

SUMMARY OF THE DISCLOSURE

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Inventive concepts are illustrated in a series of examples, some examples showing more than one inventive concept. Individual inventive concepts can be implemented without implementing all details provided in a particular example. It is not necessary to provide examples of every possible combination of the inventive concepts provided below as one of skill in the art will recognize that inventive concepts illustrated in various examples can be combined together in order to address a specific application.

Other systems, methods, features and advantages of the disclosed teachings will be or will become apparent to one with skill in the art upon examination of the following figures and detailed description. It is intended that all such additional systems, methods, features and advantages be included within the scope of and be protected by the accompanying claims.

DETAILED DESCRIPTION

Figure 1:
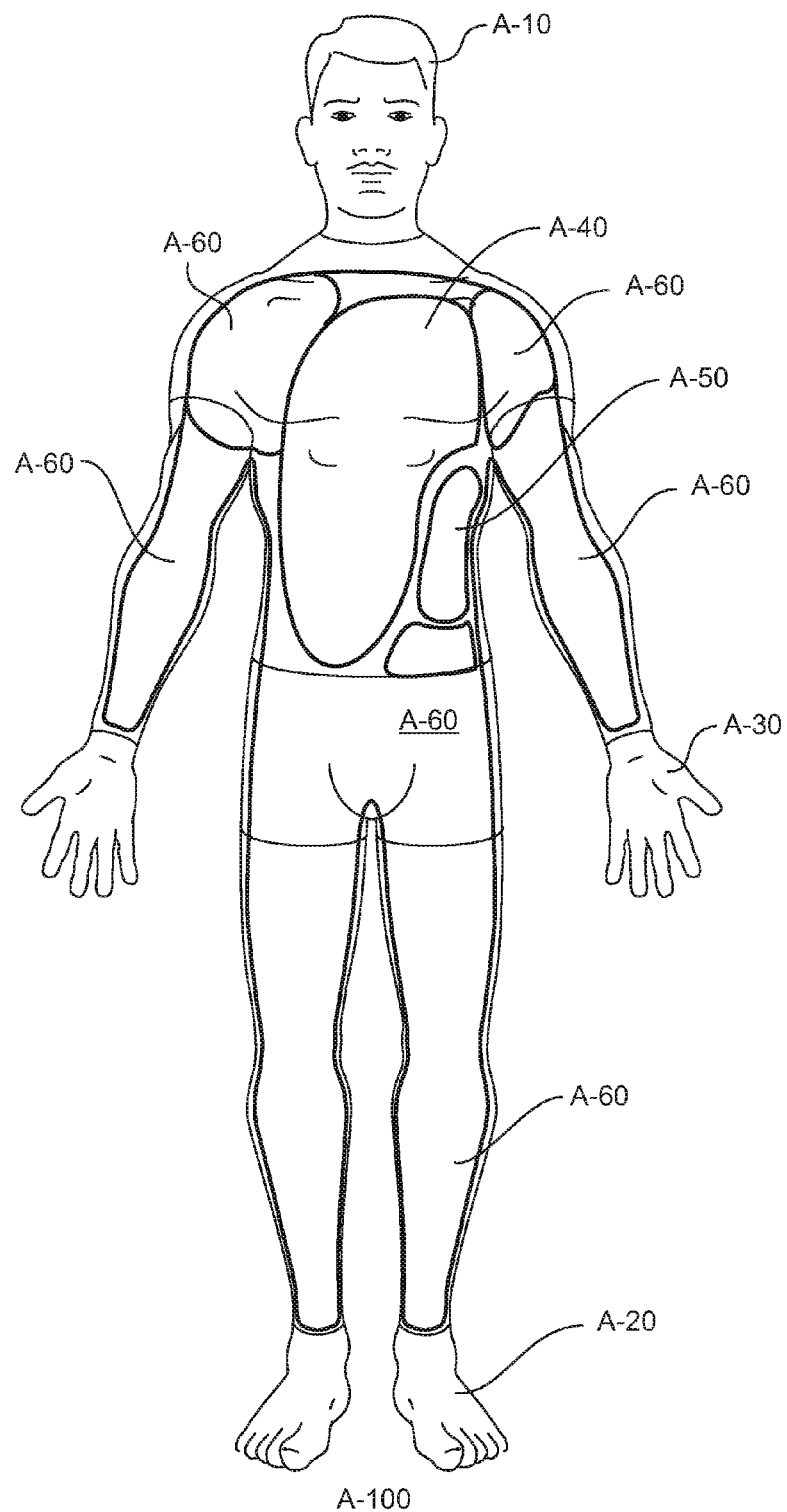
FIG. 1 is a top view of a segmented mannequin A-100. The mannequin may include certain permanent features such as a mannequin head A-10, mannequin feet A-20, mannequin hands A-30.

FIG. 1 is a top view of a segmented mannequin A-100. The mannequin may include certain permanent features such as a mannequin head A-10, mannequin feet A-20, mannequin hands A-30. These permanent features may be made of a material that roughly approximates the feel and weight of a human component although without the need to emulate the properties of tissue when cut or sewn. These components could be obtained from sources that provide mannequin parts for mannequins used for CPR practice. The permanent mannequin parts used away from the surgical sites are there to assist in the perception in the staged reality that the patient is a living person. Alternatively, preserved parts from a cadaver may be used. In other alternatives, these body portions that are not directly involved with a staged reality of an event requiring surgery may be omitted and covered with drapes.

Staged reality component A-40 may be some subset of the mediastinum. For example, A-40 may represent a heart and pair of lungs. A separate staged reality module present in FIG. 1 is a spleen module shown as A-50. Note that while this example shows two active staged reality modules, in many training exercises, a single staged reality module will be presented with a number of repetitions.

The remainder of the segmented mannequin A-100 may be filled with a series of mannequin filler pieces A-60. The filler pieces may be made of ballistic gelatin. Ballistic gelatin approximates the density and viscosity of human muscle tissue and is used in certain tests of firearms and firearm ammunition. Approximating the density of human tissue may add to the realism by adding weight to the mannequin segments that approximates the weight of actual human components so that lifting a leg of the mannequin approximates the effort to lift a human leg. Alternatively, multiple staged reality modules may be present on single mannequin.

Filler pieces made of ballistic gelatin may have a finite life as that material degrades. An alternative material for filler pieces may be made from commercially available synthetic human tissue from a vendor such as SynDaver™ Labs that supplies synthetic human tissues and body parts. SynDaver™ Labs is located in Tampa, Fla. and has a web presence at http://www.syndaver.com/. Some mannequin filler pieces may be sized to fill in around a specific staged reality module such as the spleen staged reality module. Others may be standard filler pieces for that particular mannequin. (A child mannequin or a mannequin for a super obese patient may have proportionately sized filler pieces).

Figure 2:
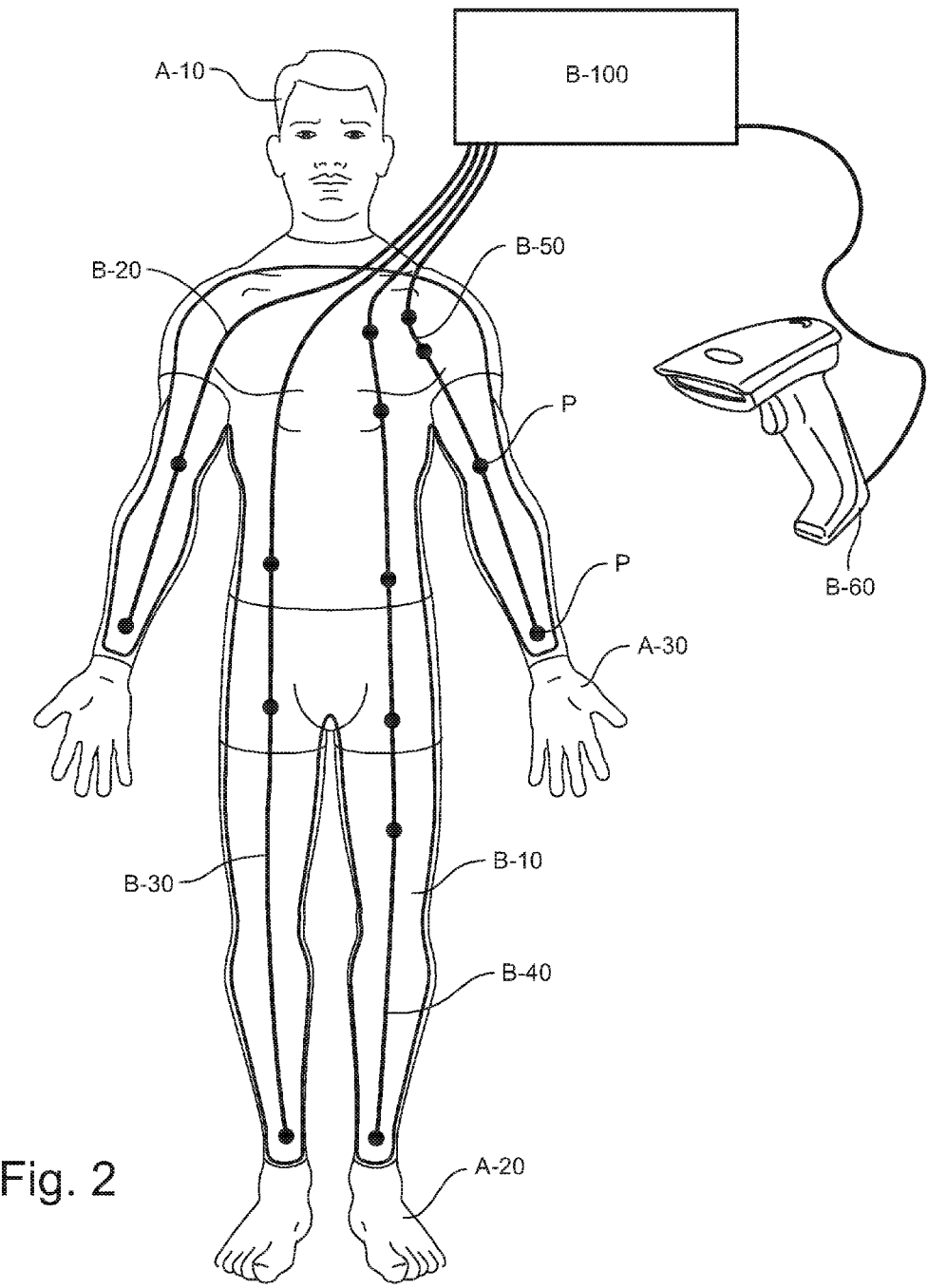
FIG. 2 shows a segmented mannequin A-100 with an open body cavity B-10 without the staged reality modules A-40 and A-50.

FIG. 2 shows segmented mannequin A-100 with an open body cavity B-10 without the staged reality modules A-40 and A-50. FIG. 2 also lacks the mannequin filler pieces A-60 but retains the permanent mannequin parts A-10, A-20 and A-30.

The mannequin may include drain gutters and drain holes to remove excess liquid from the body cavity (not shown).

FIG. 2 includes a high level representation of the control system. Master-controller B-100 is connected to a series of umbilical cables, shown here in this example as umbilical cords B-20, B-30, B-40, and B-50. The mannequin may have fewer than four umbilical cables or more than four umbilical cables without departing from the teachings of the present disclosure. As described in more detail below, each umbilical cable may provide some combination of one or more pneumatic supply lines, one or more pressurized fluid supply lines, one or more instrument communication buses, and low voltage electrical supply to power module electronics and sensors.

FIG. 2 includes a series of ports P at various points along the four umbilical cables. The ports P allow for a staged reality module to be connected to an umbilical cord to receive pressurized fluids, pneumatic air (or other gas), connection to instrument communication buses, and low voltage electrical supply. While for simplicity, each port P is shown as an enlarged dot, a port is likely to have a series of different connections for different services provided to a module. Unless the port is located at the distal end of an umbilical cable, the port may appear as a short branch that is part of a T-connection to the umbilical cable.

A particular module may connect to one or many different connections. Several staged reality modules (such as A-40 and A-50) may be connected to ports along one umbilical cable (B-40). A designer of a comprehensive mediastinum module representing a number of structures found in the thorax cavity might find it useful to connect to ports on two parallel umbilical cables (such as B-30 and B-40) in order to minimize routing of connectors within the module.

FIG. 2 includes a bar code scanner B-60 that may be used to read bar code information from the packaging for the staged reality module. A bar code or other optical code could be used to convey a unique identifier for the module (source and unique serial number). A series of bar codes, a data matrix code (a two-dimensional matrix bar code), or some other optical code could be used on the module packaging to convey an array of data about the module. This data could be different for different types of modules but it may include the creation date of the module, the harvest date when the tissue components of the module were collected, and characterization data that may be relevant.

Characterization data may include:

A) a lot number which would provide a way to know that a given set of modules was created at the same time and intended to be used to provide substantially repeatable staged reality simulations;

B) a grade number which would apply across more than one lot so that modules created at different times but to a certain array of standards would have the grade number so that modules within the same grade number could be used if a sufficient number of modules within a particular lot number were not available;

C) an indication of the level of blockage of certain vessels;

D) an indication of the level of pliability/stiffness of certain tissue structures (which may increase the level of difficulty for certain procedures and mimic characteristics of certain patient populations);

E) an indication of the level of obesity associated with this module which may include the use of simulated fatty material that was added to the module to obfuscate the structure of the underlying tissue as often happens in actual surgery.

One material found to be suitable is called "goop". A recipe for goop found at http://www.makingfriends.com/r_goop.htm is below:

Goop
Mixture 1: ¼ cup Cornstarch
4 oz. white glue
Mixture 2: ½ tsp. Borax
¼ cup Warm Water
Liquid Food Coloring Sift cornstarch into bowl. Add glue. Mix well. In second bowl mix water, food coloring and Borax until dissolved. Pour Mixture 2 into Mixture 1. Stir constantly for 2 minutes even after goop forms. Kneading will work out some stickiness.

In general, the organs may be characterized using a wide variety of available metrics. These may include volume of ventricles, stiffness of the muscle tissue (restitution test), specific gravity, % fat, pressure testing, etc. The recorded metrics will be specific to the scenario being replicated. Ideally, the organs selected are as close to the size and weight of human organs.

The bar code scanner may also be used to read bar codes on equipment or faux drug delivery devices to augment the simulation with recording the receipt of the therapy from the equipment or provision of a specific amount of a specific drug (even if no drug is actually delivered to the mannequin). This information may be used by the master-controller or communicated to one or more staged reality modules to alter the staged reality. For example, the intramuscular or intravenous delivery of a drug may alter the rate of bleeding, the heart rate, or some other parameter that impacts the presentation of the staged reality.

Functions of the Master-Controller

Master-controller B-100 is shown in FIG. 2 as a single component but it may in practice be distributed over several pieces of equipment.

Master-controller provides to the umbilical cables one or more pneumatic supplies. One pneumatic supply may be a closed loop system where air flow passes into and back from the umbilical cables on a periodic basis. For example, to support a staged reality of a beating heart, one pneumatic supply line may have air that pulses into the pneumatic line at 78 beats per minute. Optionally, this rate may be adjustable and may be altered to simulate a heart that stops or goes into some form of distress. Inflatable elements within the staged reality modules may thus expand and contract as paced by the pulses of air. Having a closed system avoids situations where staged reality module elements are overfilled. The amount of air provided by the pulse into the pneumatic line may be fine-tuned by the operator in order to adjust the simulation.

Figure 3:
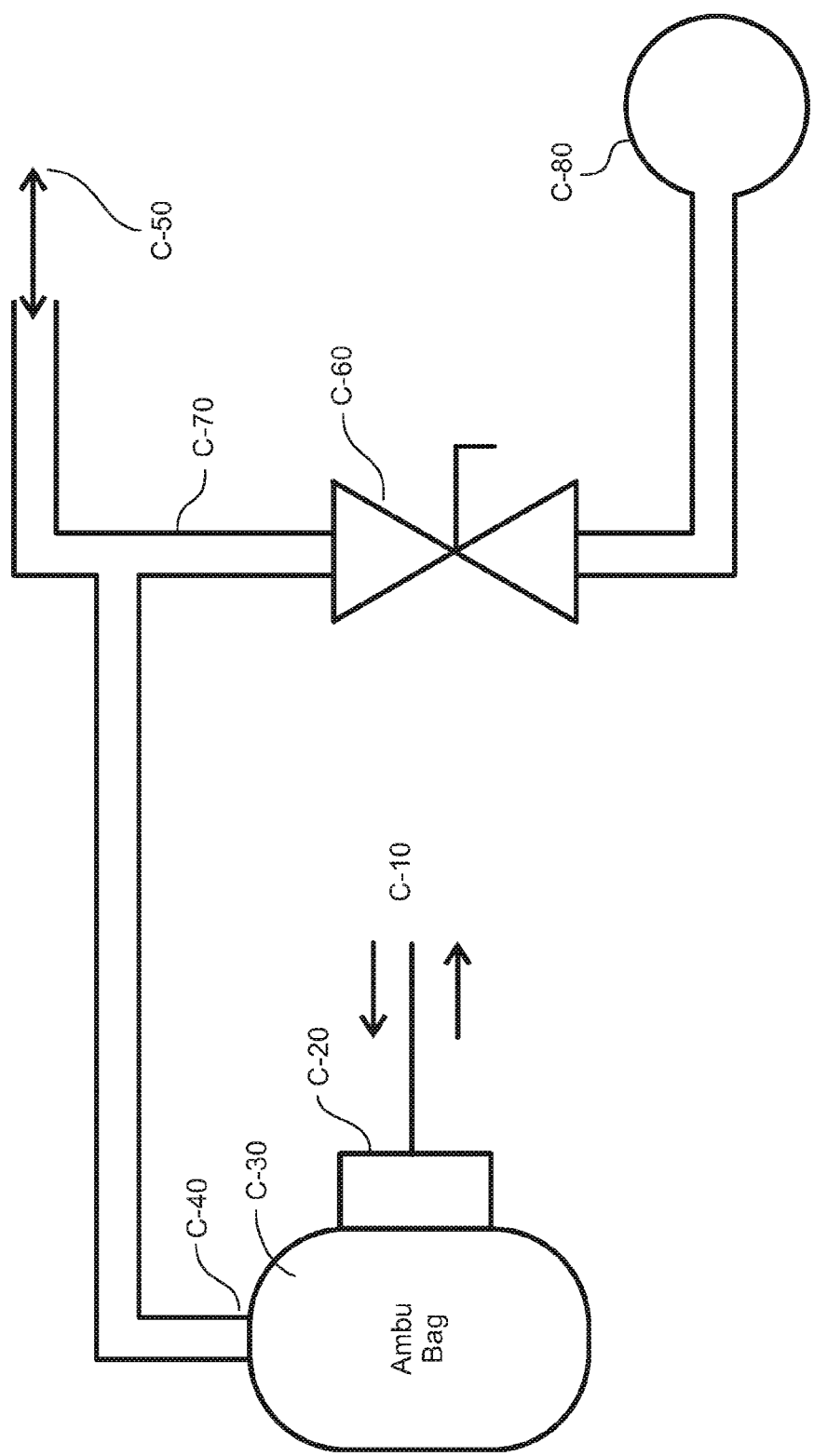
FIG. 3 shows a diagram for a pulsatile air pump.

A pulsatile pump which better emulates a heartbeat than a sinusoidal oscillation of air in the pneumatic line may be included in the master-controller or the master-controller may receive pulsatile air from an external pulsatile pump. One suitable pulsatile pump is described in U.S. Pat. No. 7,798,815 to Ramphal et al for a Computer-Controlled Tissue-Based Simulator for Training in Cardiac Surgical Techniques (incorporated herein by reference). A pulsatile pump may be created as indicated in FIG. 3.

Additional pneumatic supply lines at various target air pressures may be included in the umbilical cable.

The umbilical cable may include lines at ambient pressure (vented to ambient) or at a slight vacuum to allow expanded balloon-type structures to be emptied.

The master-controller may provide one or more fluids. The fluids may contain medical grade ethanol, dyes, and thickening agents. Medical grade ethanol has been found useful in maintaining the staged reality modules and in making the staged reality modules inhospitable to undesired organisms. Ethanol is useful compared to other chemicals which may be used to preserve tissue in that the ethanol maintains the pliability of the tissue so that it behaves like live tissue in a patient. A mixture with 40% ethanol works well, but the mixture should be made with an effort to avoid flammability when exposed to sparks or a cauterization process. Ethanol is desirable in that it does not produce a discernable odor to remind the participant that this is preserved tissue.

The storage life of some staged reality modules may be extended by storing them with fluid containing ethanol. A particular staged reality module that is not expected to be exposed to ignition sources should be made with an ethanol mixture that would be safe to have in proximity in a mannequin adjacent another staged reality module that did have ignition sources.

The master-controller may isolate the umbilical cable or cables from the fluid supply to allow the replacement of a module to allow the trainee to repeat a simulation with a new staged reality module.

Some staged reality modules may have prepared the module by connecting the venous and arterial systems together so that one pressurized fluid supply may animate both the arterial and venous vessels by filling them with colored fluid. The pressure for the fluid may be maintained by mere fluid head as an IV bag is suspended at a desired height above the master-controller or the master-controller may provide fluid at a given pressure using conventional components.

The umbilical cable may be provided with two blood simulating fluids, one being dyed to resemble arterial blood and a second dyed to resemble venous blood.

When the mannequin is to be used outdoors with a low ambient temperature, the staged reality module may have a circulation path that allows a warm fluid (approximately body temperature) to be circulated through the staged reality module and the umbilical cable to maintain the warmth of the tissue in the staged reality module. For staged reality modules that are expected to be completed within a short period of time, the staged reality module may be preheated to body temperature before the staged reality event and the fluids provided may be warmed to avoid cooling the staged reality module even when the fluid merely fills vessels in the staged reality module and is not circulated.

The umbilical cable may be provided with fluid lines for one or more non-blood fluids to be simulated such as digestive fluids, cerebral-spinal fluids, lymphatic fluids, fluids associated with pulmonary edema, pleural effusions, saliva, urine, or others fluids depending on the disease or trauma to be simulated.

The fluid and pneumatic connections used to connect the staged reality module to the various supplies on the umbilical cable may be any suitable connector for the desired pressure. Quick-connect fittings may be preferred so that the act of replacing a module with a similar module to allow the trainee to try it again may be accomplished quickly.

Depending on the quick-connect fitting used, the port may need to have blanks inserted to close the port to flow. When a module is to be connected to the port, the blank is removed and the module is connected.

The master-controller may record the volume of fluids and gas provided to the particular lines or alternatively the pressure maintained on particular lines over time. This data record may be used to assess when a trainee effectively ligated a blood vessel or shut off some other structure such as a urinary tract.

The umbilical cable may include one or more instrument control cables. Control cables with common interface standards such as USB (Universal Serial Bus) may be used. The USB connection may be used to provide power to instruments and local logic devices in the staged reality modules. One of skill in the art will recognize that other data communication protocols may be used including RS-232 serial connection. IEEE 1394 (sometimes called FireWire or i.LINK), and even fiber optic cable connections.

The USB connection allows for communication between a module and the master-controller. Depending on the staged reality presentation the communication may be to the module such as:

A) The master-controller may send random or triggered commands for a staged reality component to twitch within a staged reality module.

B) The master-controller may send a command to one or more staged reality modules to instigate quivering such as may be seen from a patient in shock. The staged reality module may implement quivering by opening and closing a series of small valves to alternatively connect a small balloon like structure to a high pressure gas via a port on the umbilical cable or to a vent line in the umbilical cable via the umbilical cable port. The valves providing the pressurized gas or venting of the balloon-like structure may be under the local control of logic within the staged reality module or they may be controlled directly from the master-controller.

C) The experience of staged reality may be increased by having more than one staged reality module quiver at the same time. Mannequins may make gross motions in response to pain such as sitting up or recoiling to add to the staged reality. This may startle the participant, but that may be a useful addition to the training.

The USB connection allows for communication from the staged reality module to the master-controller such as a time-stamp when the module detects the surgeon starting to cut into a portion of the module, pressure readings, accelerometer indications (respect for tissue).

The master-controller may receive input from a simulation operator. The simulation operator may trigger adverse events that complicate the staged reality scenario such as a simulated cardiac event. The adverse event may be added to challenge a participant that has already demonstrated mastery.

The master-controller may serve as part of a data collection system that collects data about the training of each particular participant so that the effectiveness of one training regime for one population of participants can be compared with the effectiveness of another training regime on another population of participants so that the differences of effectiveness can be quantified.

The master-controller may have access to the training records for a particular participant in order to assess the need for additional repetitions of a particular training module.

Example—Severe Trauma to Lower Leg

Figure 4:
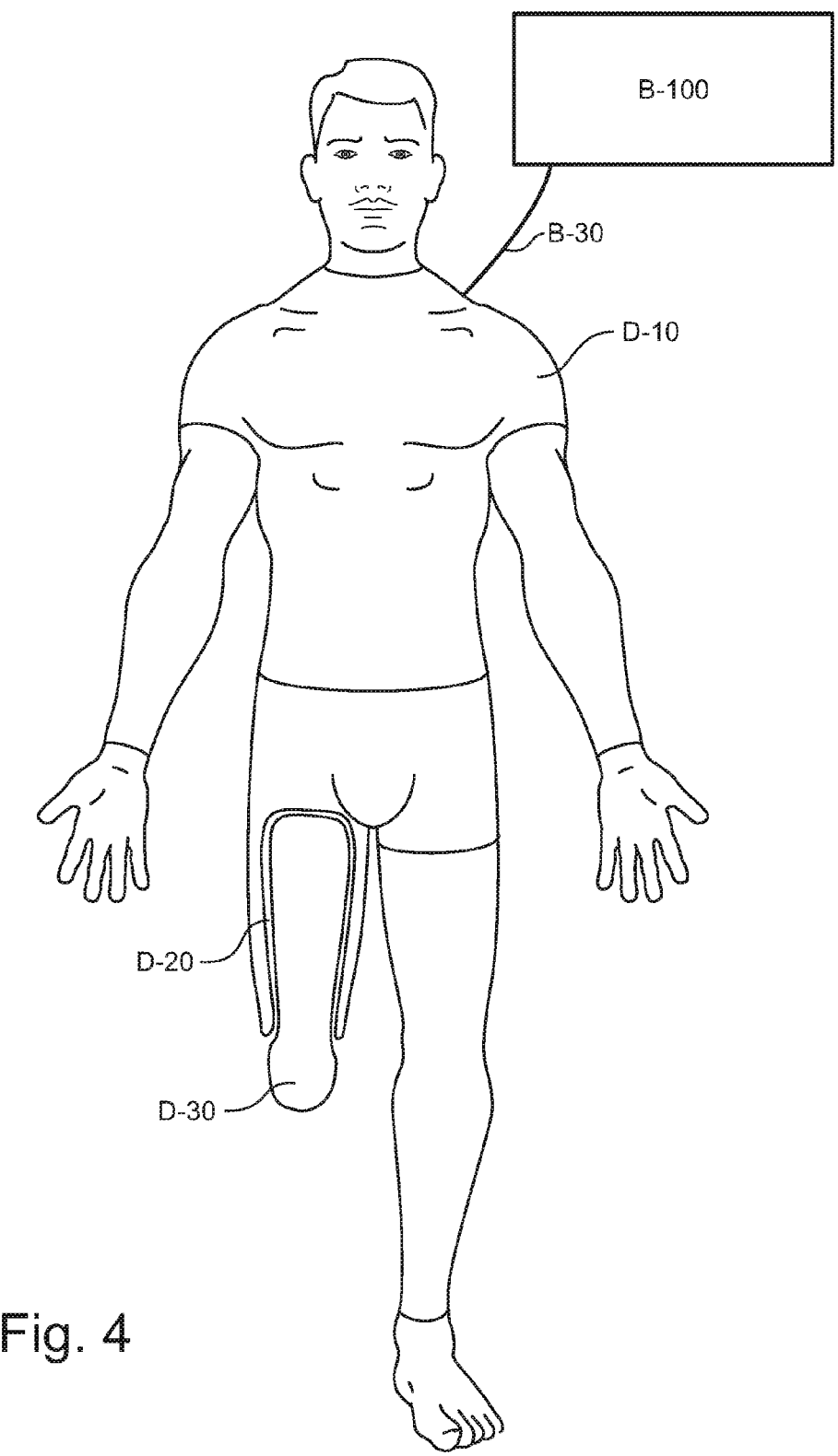
FIG. 4 shows a leg trauma mannequin D-10.

FIG. 4 shows a leg trauma mannequin D-10. The leg trauma mannequin D-10 may be A) full sized as shown here; B) just from the waist down; or C) just the left leg. Leg trauma mannequin D-10 may be connected via umbilical cable B-30 to master-controller B-100. The leg trauma mannequin D-10 includes a cavity D-20 that may receive a leg trauma staged reality module D-30. The staged reality module D-30 may have a bone element that may be a bone harvested from a cadaver, a bone harvested from an animal, or a bone element manufactured for use in the staged reality module. Tissue harvested from an animal may be combined with the bone elements to create a staged reality module. This tissue may be augmented with artificial blood vessels.

Thus one of the teachings of the present disclosure is that it may be advantageous to create hybrid staged reality modules comprising a combination of human cadaver components combined with harvested animal tissue and possibly augmented with synthetic components.

The staged reality module D-30 may protrude from the mannequin D-10 to allow the participant to apply a tourniquet to stem massive blood flow such as from a car accident, battle wound, or land mine injury. A tourniquet applied incorrectly will destroy the tissue more distal to the heart than the tourniquet. Thus, training on the appropriate techniques will improve clinical outcomes and quality of life for actual wound victims.

The staged reality module D-30 may be part of a group of staged reality modules made to a particular standard so that a participant's performance in stopping the blood flow may be meaningfully compared to prior performances by this participant against this particular staged reality or to compare participants against a pool of participants that have participated in this staged reality (including participants that have used analogous mannequins at other training facilities). As discussed below, the lot number or set of standards that govern a particular staged reality module may be communicated to the master-controller by a bar code reader or other input device.

The staged reality may be quantitatively assessed by gathering the volume of blood loss and the pressure levels that can be maintained on the venous and arterial blood lines. Graphs of blood loss and pressure levels over time may be presented to the participant as part of the informed assessment review of the participant's performance.

Input from Observer to Master-Controller.

The master-controller may optionally receive real time input from the skilled observer to augment the quantitative measurements being made during the staged reality procedure.

Audio Output from the Master-Controller

The master-controller may be used to augment the staged reality by providing background sounds such as would be found in a hospital during a particular type of surgery or would be found during a battlefield/first responder scenario.

The master-controller may emit specific sounds such as a patient in pain with groans or other sounds indicating pain. Input from one or more staged reality modules indicating that the patient is being moved or otherwise likely to be experiencing elevated pain levels may trigger more frequent, loud, or intense expressions of pain.

The master-controller may emit odors that are relevant to enhancing the staged reality. The odor of burnt flesh, of blood or other body fluids, or simply the smell of smoke from a plane crash or battle activity may help make this staged reality event seem real to the participant.

Examples of Staged Reality Effects

Example of Xenogenic Organ Preparation

Porcine organ blocks consisting of the heart with pericardium, lungs, trachea, esophagus, and 8-12 inches of aorta were obtained from a local supplier. No animals were sacrificed for the purposes of our research as the organ block was harvested from an animal before butchering the animal for food products.

Organ preparation began with an incision of the pericardium on the right posterior side of the heart so that it could be reattached with no noticeable holes when viewed from the left side. The superior vena cava, inferior vena cava, right pulmonary artery, and right pulmonary veins were then divided with care taken to leave as much vessel length as possible. After the right lung was detached fully, the organs were washed extensively to remove coagulated blood from the heart and vessels. All divided vessels except for the main branch of the right pulmonary artery and right superior pulmonary vein were then tied off using 0-silk.

Small diameter plastic tubes with Luer-Lok® connectors were then placed into the divided right pulmonary artery and right superior pulmonary vein, and fixed using purse-string sutures. To create distention of the aorta, silicone caulking was injected to the level of the ascending aorta.

After the silicone had cured, the brachiocephalic trunk and left common carotid were tied off using 0-silk. Finally, the left main stem bronchus was occluded by stapling the divided right main stem bronchus as well as the proximal trachea. The left hilum remained unaltered, and all modifications to the heart were hidden by the pericardium during the procedure.

Following preparation, the organs were stored at 4 degrees Celsius in 10% ethanol containing ½ teaspoon of red food coloring, where they remained fresh for at least 1 month.

40% ethanol can preserve the organs for over a year. Several hearts that were prepared and stored for 18 months performed as well as freshly harvested organs.

The porcine organ block can be placed in a lower tray to retain fluids analogous to a metal baking tray. For purposes of simulating a human, the porcine heart can be rotated to emulate the position of a human heart in a torso. For example, the left side of the porcine heart can be placed into the tray with the left lung placed over an inflatable air bladder.

Inflation and deflation of lungs of a real patient causes the rise and fall of the mediastinum. An appropriate volume of air or some other fluid may be used to inflate and deflate an appropriately sized and placed container hidden under the tissue to be animated with movement. For example a respiration rate of 20 breaths per minute can be simulated by periodically expanding an air bladder such as a whoopee cushion, or an empty one-liter IV bag that is folded in half.

Lightly pressurized water/paint mixture resembling blood can be provided through a connection to the umbilical cable port to provide blood emulating fluid into the divided right pulmonary artery and divided right superior pulmonary vein to distend and pressurize the venous and arterial systems. Static fluid pressure within the vessels was achieved using gravity flow from a one-liter IV bag. Pressure is limited to avoid severe pulmonary edema. Extended perfusion times (1-2 hours) may be maintained without substantial fluid leakage into the airways by preparing the porcine organ block to occlude the left mainstem bronchus to inhibit leaking and loss of pressure.

A balloon placed in the heart and connected to a closed system air source to allow for emulating the beating of a heart (such as at a rate of 78 beats per minute) adds to the sense of realism of the staged reality event.

Thus this staged reality module could be animated by providing one quick connect fitting to connect the heart balloon to the air supply to provide the beating heart effect. A second quick connect fitting to a different pneumatic connection in the umbilical cable provides the lung movement air. A fluid quick connect fitting connected to the joined blood vessels allows for slightly pressured simulated blood to be provided from the umbilical cable.

As used in this specification, a quick connect fitting is one that may be connected to a corresponding fitting without the use of tools. A quick connect fitting may be used to connect to hydraulic line, pneumatic line, electrical line, or digital communication bus.

The container with the staged reality module may include photographs representative of what would be seen in an actual human undergoing this surgical procedure in order to support the staged reality.

Thus, this animated staged reality module may be quickly inserted into a relevant portion of a segmented mannequin, connected via an array of quick connect fittings to corresponding fittings on a convenient umbilical cable port to quickly prepare a mannequin for surgery on this site. Other staged reality modules may be likewise connected. Pressure levels (such as the height of an IV bag supplying the master-controller) or pulse volumes (for heart or lung motion) may be adjusted at the master-controller. The mannequin may then be draped to expose the relevant surgical sites.

Optionally, the packaging carrying the staged reality module (the porcine organ block with modifications and quick connect fittings) may include a bar code, data matrix code, other optical code, or other machine readable data storage device that is accessed by a bar code reader or other reader device in data communication with the master-controller. Thus data concerning this specific staged reality module may be made available to the master-controller and combined with other information gathered during the surgical simulation and made part of a data record for this training or certification session. Another option would be the use of a passive RFID label.

Development of a Module Lot

A group of animal tissue collections may be made from a series of animals before butchering for food so that no animals are sacrificed beyond what would be butchered for food. By collecting a series of tissue collections by the same facility using the same procedure from the same herd of animals (same breed, same age, same food), there will be extensive similarities among the collected tissue samples. As is understood by those of skill in art, some features vary even between identical twins such as the vascular pattern around the exterior of the heart so some features cannot be closely controlled. However, certain degrees of variability can be decreased by clustering tissue samples by gender of donor animal, nominal weight of donor animal, or some other property of the animal or classification made of the harvested tissue sample.

Examples of classification of the tissue samples may include:

A) Some characterization of the amount of fatty material surrounding the tissue of interest.

B) Some characterization of the pliability/stiffness of the tissue.

C) Some characterization of the properties of the relevant blood vessels such as degree of occlusion.

D) One way to characterize an organ is the time it takes for a fluid to drip out from a container and into an organ. As the receiving volume of the organ will be relatively uniform (for organs of the same size) this may characterize the ability of fluids to flow through the structures in the organ and out.

Standardized Trauma

While having similar tissue for use in creating various staged reality modules within a lot is helpful, the ability to precisely create trauma in ex vive tissue samples is of even greater importance. Having harvested tissue samples of a similar size and quality allows the tissue samples to be placed in a jig so that the trauma may be applied in a controlled way a precise offset from one or more anatomic markers. Examples of trauma include:

A) A set of uniform metal pieces may be created and implanted a set depth in a set location to allow for a set of shrapnel wounds to be placed in a series of tissue samples that will become staged reality modules within a given lot.

B) A particular volume of silicon or some analogous material may be placed in the same location in a series of harvested lungs to emulate lung tumors.

C) Trauma may be emulated for chemical burns or other trauma to the outer layers of tissue of a faux patient.

D) In lieu of implanting faux ballistic debris, organs placed in jigs could receive ballistic projectiles from a weapon. In order to verify that the trauma induced fits within the parameters for this particular set of traumatized organs, the trauma could be examined and characterized by ultrasound or some other diagnostic imaging method. One may also sprinkle a little gunpowder around the wound just before the session started and ignite it to create fresh burns and realistic smells of the battlefield.

Spleen Example

A second example of a staged reality module is a spleen that has received a standardized shrapnel injury (precise and repeatable insertion of standardized pieces of metal rather than actual pieces of shrapnel from an explosion). The staged reality module for the injured spleen could be placed as module A-50 (FIG. A). The staged reality module would be prepared with quick connect fittings to allow connection to a port on an umbilical cable to provide a source of faux blood and to provide a clear liquid to weep from the wound. Optionally, the spleen may have instrumentation to provide an indication of when the spleen was first by cut the surgeon. This information could be conveyed by the data bus.

In order to provide a standardized set of injured spleens for testing or simply for use in an ordered curriculum, a set of substantially identical spleens harvested from donor animals that will be butchered for food may be prepared in the substantially same way.

As noted above, the packaging may convey information about the staged reality spleen module.

Alternatives and Variations

Uses of Modular Staged Reality Mannequins

The examples given above addressed the training of surgeons, possibly while they are residents in training to become surgeons or specialized surgeons such as cardio-thoracic surgeons. The present disclosure may be extended to other situations that would benefit from the ability to provide repeated staged reality simulations of a particular trauma or malady such that the medical practitioner may gain experience and demonstrate mastery of a particular set of skills or capacity to perform a particular procedure. Nothing in this disclosure should be interpreted to limiting the teachings from this disclosure to emulations of a hospital surgery or to procedures normally performed by a surgeon. The term "surgery" where used in this disclosure should be read expansively (unless expressly limited to a narrower meaning) to include any medical procedure, including those performed on a battlefield or by first responders.

Non-limiting examples include:

A) Use of staged reality to present to a medical certification applicant a particular staged reality as part of a certification process. Provision of substantially similar staged reality scenarios may be provided to a set of medical certification applicants at one facility in order to provide a uniform certification experience for the set of applicants. Optionally, the provision of substantially similar staged reality scenarios may be staged at a range of testing locations and over a range of dates using similarly prepared tissue modules and collecting similar data streams.

B) Use of staged reality to provide baseline training to experienced surgeons on the roll-out of a new medical procedure so that the surgeons may achieve a baseline level of mastery before attempting a procedure on a human patient with or without the assistance of a representative of the medical company that developed the new procedure.

C) Use of staged reality to prepare a surgeon or other medical professional who is a member of the military reserves with the techniques, equipment, and time pressures that may be relevant for deployment as a military surgeon.

D) Use of staged reality to provide baseline training to those who will be doing clinical testing of a new medical procedure to allow for documentation that the participants performing clinical testing have been uniformly trained. The training of participants in clinical training may be performing clinical tests on human or animal subjects.

E) Use of staged reality to provide baseline training to first responders and military medics. After mastery in a laboratory setting, the same staged reality experience may be repeated with a field portable unit so that the trainee may attempt to perform the procedure outside, on the ground, in the elements, with poor lighting, with noise and other activity around the trainee.

F) Use of staged reality on a pair of segmented mannequins to allow organ transplant teams to practice a number of repetitions of harvesting components from the donor-mannequin and moving the harvested components to the recipient-mannequin.

G) The mannequin could be prepared with appropriate sensors reflect certain wounds and then used to teach nurses and staff how to move and care for an injured person, pre or post-surgery.

Gender-Age-Weight

While the figures provided with this disclosure may be limited to a segmented mannequin that is without any specific gender, nothing in this disclosure limits the use of staged reality to gender neutral training simulation. Gender specific anatomy including anatomy of the reproductive systems may be used for staged reality training. Staged reality may be used in connecting with situations involving a pregnant woman and with a simulated human fetus.

While the figures provided with this disclosure may be primarily addressed to adult or slightly oversized adult mannequins (so as to provide ample room within the mannequin for the staged reality tissue), the present disclosure can be used with a segmented mannequin that is sized for use in emulating disease or trauma for an infant or child. For example, segmented mannequins with appropriate staged reality modules may be useful in providing repeated opportunities for intubating a pediatric patient.

The present disclosure may be used in connection with segmented mannequins that are designed to emulate a morbidly obese patient or even a super obese patient. Alternatively a segmented mannequin that emulates a severely underweight patient may be useful for training medical personnel that may be exposed to victims of famine.

Orientation and Completeness of the Mannequin

One of skill in the art will recognize that not all procedures are done on a patient in a supine position. Some procedures are performed on a patient in a prone position so that the posterior aspect of the body is readily accessible. Some procedures call for lateral entry. Many surgical procedures call for specific patient positioning using wedges, bean bags, sand bags, stirrups, and other positioning aids. The teachings of the present disclosure can be used with mannequins with adequate flexibility to assume specific positions as assumed by patients for particular procedures or mannequins created in the appropriate orientation to emulate a positioned patient.

Mannequins for battlefield or first responder training may be positioned or manufactured to be in a contorted position not resembling a standard surgical position used for patients in a hospital.

While a complete mannequin may be the most convincing for creating a staged reality, a mannequin that emulates a portion of a patient such as a limb, the head, or a portion of the torso may be a cost appropriate solution. Such a mannequin may be useful for field training as there would be less to carry out to the field.

Some staged reality modules may be used within a general purpose mannequin that accepts a number of different staged reality modules at a number of different umbilical cable ports. These same staged reality modules may also be used in more limited mannequins including those with as few as one umbilical cable port. Having a standardized connection even if there is only one port is useful in that many different mannequins can be made in accordance with a standard to make it easy for staged reality modules to be used across mannequins and to have a standard interaction with master-controller units.

Location of Surgical Site

While the segmented mannequin provided to illustrate concepts in this disclosure did not feature staged reality modules in the hands, feet, or head of the mannequin, the teachings of the present disclosure can be extended to those locations so that orthopedic procedures of the extremities, podiatry, certain maxillofacial surgical procedures, dental procedures, and even neurosurgery may be simulated.

Sensors Connected to the Trainee

Optionally, the master-controller may monitor one or more data streams providing physiological data about the trainee surgeon. Polygraph instruments are used to detect the stress levels of a person being interviewed about a crime or analogous topic. While there is not a need to detect deception by the surgeon trainee, it may be instructive to capture one or more parameters such as blood pressure, pulse rate, respiration rate, or skin conductivity to see if errors in surgical procedure detected by the master-controller or the skilled observer correspond to indications of elevated or changing stress levels.

A secondary benefit of the collection of data indicative of stress or stimulation level is that this material may be useful in evaluating whether certain peripheral stimulus in the simulation promotes the suspension of disbelief as there may be a marked change in the data stream for a trainee as the trainee shifts into a belief that this is a real patient on the table. Peripheral stimulus may include sounds that emulate sounds that might be present in a real surgery or first responder scenario. Peripheral stimulus may include movement of faux staff members treating a part of the patient's body away from the trainee's surgical site.

Fluid Management

The surgeon participant may be required to emulate actual surgery with the placement of fluid drains and the use of suction to remove fluids from the surgical site. The fluid removal would be via traditional surgical tools rather than routed through the umbilical cable.

Topography of the Umbilical Cable Routing

One of skill in the art will recognize that instead of a series of two or more parallel umbilical cables, that an umbilical cable loop could be used with two ends that terminate at the central controller and a series of ports along the loop.

Use of Working Gases Other than Air

While the examples given above have referenced air as the gas used in the pneumatic lines, the present disclosure does not rely on unique properties found in ambient air. The air may be modified as is known in the art to add lubricants or humidity depending on the needs of the simulation and the equipment involved. In one embodiment, the air may be replaced with some other gas such as nitrogen.

Video Feeds

Optionally, the staged reality modules could be provided with embedded endoscopic bundles that could be routed independently of the umbilical cable to provide the instructor/evaluator with a view of the surgical site that might be difficult to view as an observer not directly aligned with the line of sight of the surgeon. Alternatively, small cameras with built-in analog to digital conversion could connect with a data port on the umbilical cable to provide video for use by the instructor/evaluator. The choice of camera technology used for this application will need to be coordinated with the anticipated availability of light at the surgical site but the surgical site (once opened by the surgeon) is typically well illuminated for the benefit of the surgeon.

Alternative Pulsatile Air Pump

FIG. 3 shows a diagram for a pulsatile air pump. The air provided to the pulsatile air supply on the umbilical cable can be generated as symbolized by elements in FIG. 3. A linear input source (potentially stabilized by a linear bearing) moves a contact element C-20 relative to an anchored Ambu bag C-30. An Ambu bag (also known as a bag valve mask ("BVM")) is a hand-held device used to provide positive pressure ventilation to a patient that is breathing inadequately or not at all. The Ambu bag has a number of one way valves useful for this purpose.

One of skill in the art will recognize that moving the contact element C-20 relative to the Ambu bag will mean that for a portion of the stroke of the linear actuator C-10 that the contact element does not impact the Ambu bag. Thus the input to the Ambu bag C-30 can be altered from a sinusoidal input to more of a pulsatile input. Adjustments to the size of the Ambu Bag or its analogous replacement, the size of the contact element C-20 and the stroke length of the linear actuator after contact with the Ambu Bag will alter the air output at C-40. While the linear actuator C-10 could be a stepper-motor, other simpler solutions such as a windshield wiper motor could be used.

If this air source is used to animate a heartbeat then it would need to operate at a reasonable pulse rate for example 78 beats per minute. This pulse rate could be adjustable if desired or relevant to the staged reality.

Alternatively, if the air source is used to animate movements in response to respiration, then the pulses per minute would need to be reasonable for a patient undergoing surgery.

Fine tuning to control the amount of air C-50 provided to the umbilical cable (not shown) or a series of two or more umbilical cables via a header (not shown), may be achieved by a ball valve C-60 connected via Tee joint C-70. The ball valve C-60 may be used to divert air to bladder C-80 (such as a pair of balloons one within the other). The bladder should be operated in an elastic range so that the expanded bladder presses the air back towards the Ambu Bag when the Ambu Bag is not being compressed by the contact element C-20. The bladder may be connected to the air line by a segmented air nipple.

It may be desirable to maintain the pulsatile air system as a closed system so that one or more animation bladders connected to the ports of the one or more umbilical cables operate to force back the air into the tubing through operation of the bladder in an elastic range and the weight of the animated tissue.

One of skill in the art will recognize that some of the alternative implementations set forth above are not universally mutually exclusive and that in some cases additional implementations can be created that employ aspects of two or more of the variations described above. Likewise, the present disclosure is not limited to the specific examples or particular embodiments provided to promote understanding of the various teachings of the present disclosure. Moreover, the scope of the claims which follow covers the range of variations, modifications, and substitutes for the components described herein as would be known to those of skill in the art.

The legal limitations of the scope of the claimed invention are set forth in the claims that follow and extend to cover their legal equivalents.

The invention claimed is:

1. A method of providing a staged reality of a faux patient undergoing surgery comprising:
    providing a mannequin portion having a cavity therein containing an umbilical cable;
    providing, within the cavity, a first staged reality module comprising animal tissue;
    connecting the first staged reality module to the umbilical cable; and
    applying at least one animating force to the first staged reality module via the umbilical cable for permitting a participant to provide a simulated medical service on the animal tissue.

2. The method according to claim 1 comprising removing the first staged reality module and connecting a second staged reality module to the umbilical cable to permit the participant to repeat providing the simulated medical service.

3. The method according to claim 2 wherein animal tissue of the first staged reality module has a defect therein, and the animal tissue of the second staged reality module has the same defect as the animal tissue of the first staged reality module.

4. The method according to claim 3 wherein the at least one umbilical cable comprises a fluid line for delivering simulated blood to the animal tissue at the first staged reality module.

5. The method according to claim 1 wherein the umbilical cable comprises a pneumatic line for inflating and deflating the animal tissue at the first staged reality module.

6. The method according to claim 1 wherein the mannequin portion comprises synthetic human tissue within the cavity.

7. The method according to claim 1 wherein the first staged reality module comprises associated packaging having a scannable code thereon relating to at least one property of the first staged reality module.

8. The method according to claim 7 comprising scanning the scannable code using a controller.

9. A method of providing a staged reality of a faux patient undergoing surgery comprising:
   providing a mannequin portion having a cavity therein containing an umbilical cable;
   providing, within the cavity, a first staged reality module comprising animal tissue and having a scannable code associated therewith relating to at least one property of the first staged reality module;
   scanning the scannable code using a controller;
   connecting the first staged reality module to the umbilical cable; and
   applying at least one animating force to the first staged reality module via the umbilical cable for permitting a participant to provide a simulated medical service on the animal tissue.

10. The method according to claim 9 comprising removing the first staged reality module and connecting a second staged reality module to the umbilical cable to permit the participant to repeat providing the simulated medical service.

11. The method according to claim 10 wherein the animal tissue of the first staged reality module has a defect therein, and the animal tissue of the second staged reality module has the same defect as the animal tissue of the first staged reality module.

12. The method according to claim 9 wherein the umbilical cable comprises a fluid line for delivering simulated blood to the animal tissue at the first staged reality module.

13. The method according to claim 9 wherein the umbilical cable comprises a pneumatic line for inflating and deflating the animal tissue at the first staged reality module.

14. An apparatus for providing a staged reality of a faux patient undergoing surgery comprising:
   a mannequin portion having a cavity therein;
   a first staged reality module contained within the cavity, said first staged reality module comprising animal tissue;
   an umbilical cable connected to the first staged reality module; and
   an animating device connected to the umbilical cable that applies at least one animating force to the first staged reality module via the umbilical cable for permitting a participant to provide a simulated medical service on the animal tissue.

15. The apparatus according to claim 14 comprising a second staged reality module connected to the umbilical cable to permit the participant to repeat providing the simulated medical service.

16. The apparatus according to claim 15 wherein animal tissue of the first staged reality module has a defect therein, and the animal tissue of the second staged reality module has the same defect as the animal tissue of the first staged reality module.

17. The apparatus according to claim 14 wherein the at least one umbilical cable comprises a fluid line for delivering simulated blood to the animal tissue at the first staged reality module.

18. The apparatus according to claim 14 wherein the umbilical cable comprises a pneumatic line for inflating and deflating the animal tissue at the first staged reality module.

19. The apparatus according to claim 14 wherein the mannequin portion comprises synthetic human tissue within the cavity.

20. The apparatus according to claim 14 wherein the first staged reality module comprises associated packaging having a scannable code thereon relating to at least one property of the first staged reality module.

* * * * *